Jan. 24, 1939.   J. M. KEIR   2,145,009
WELDING
Filed Nov. 5, 1935

INVENTOR
JAMES M. KEIR
BY
*E. R. Greenewald*
ATTORNEY

Patented Jan. 24, 1939

2,145,009

UNITED STATES PATENT OFFICE 2,145,009

WELDING

James M. Keir, Niagara Falls, N. Y., assignor, by mesne assignments, to Union Carbide and Carbon Corporation, a corporation of New York Application November 5, 1935, Serial No. 48,291

5 Claims. (Cl. 219—10)

The invention relates to processes for joining metal members by welding, and more particularly to welding processes which require or which are aided by the provision of a "backing-up strip".

In welding operations a heavy strip of copper, steel or other metal, known as a backing-up strip, is frequently applied to the surface of the members to be joined by welding, along the line of the welding seam and on the side opposite to that from which the welding operation is to be performed, whereby molten weld metal is prevented from running out of the welding seam and a welded joint presenting a smooth back surface is obtained. For convenience of terminology the surface to which such a backing-up strip is applied, will hereinafter be referred to as the back surface of the members to be welded. Similarly terms such as the back surface of the weld, the front surface of the members to be welded, will be employed.

In some welding operations the use of a metal backing-up strip is objectionable because of a tendency to chill the weld metal, which may set up harmful stresses. Moreover, the welding action along the deeper portions of a welding seam may be incomplete and in some cases a dirty or unsound weld may result from premature setting of the weld metal. A further difficulty in the use of such backing-up strips is the fact that if the members to be welded are not perfectly flat it is extremely difficult to make the backing-up strip follow the surface closely enough to prevent the weld metal from spreading out between the backing-up strip and the back surface of the members being welded. To overcome difficulties due to chilling action, attempts have been made to back up the weld with blocks or strips of ceramic or other refractory materials having relatively low thermal conductivity, but such materials are fragile and difficult to handle, and are moreover frequently attacked by fluxes used in the welding operation in such a manner as to spoil or interfere with the weld.

The principal object of the present invention is to overcome the mentioned difficulties by providing means for backing up a weld superior to any means hitherto known.

Another object of the invention is to facilitate the welding of metal plates and the like without first beveling the edges to be joined by welding.

Another object of the invention is to provide means whereby welded joints beaded along both the front and back surfaces may be made without making a special bead weld along the back surface of the weld.

These and other objects of the invention are attained by backing up the welding seam with a powdered or granular mineral material of suitable composition supported in any suitable manner, whereby the back of the welding seam is sealed against free access of air and molten metal is prevented from running freely out of the seam.

Figure 1:
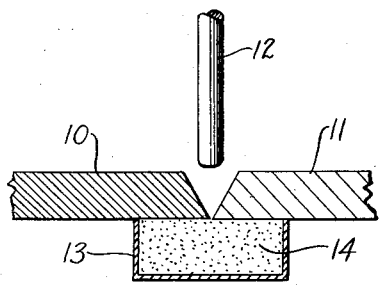
Figs. 1 and 2 are cross-sectional views respectively representing metal members having beveled edges and square-cut edges, assembled in contiguous relation for electric welding and provided with masses of backing-up material according to this invention.

In the figures, there are shown metal members or plates 10 and 11 to be joined by welding; a metal welding electrode or rod 12, either bare or flux-coated; a box or trough 13 supporting a granular refractory mineral material 14; deposited weld metal 15; and a bead or overhang 16 at the end of the weld 15.

Figure 3:
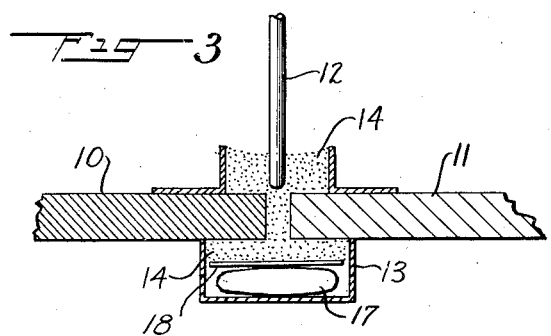
Fig. 3 represents a transverse cross-section of two metal members arranged for electric welding, with granular refractory mineral material filling the seam and enclosing each side thereof, the tip of the electrode being submerged under the mass of granular refractory mineral material extending along the front of the seam.
Figure 4:
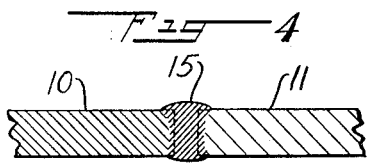
Fig. 4 represents a transverse cross-section of a weld typical of those made by the method of the invention, showing beaded front and back surfaces of the weld.

In Fig. 3 there is also shown a pneumatic tube 17 adapted to press the unbonded granular refractory backing-up material against the back surface of the members to be welded, as hereinafter described. A metal member 18 may be superimposed thereon for the purpose of distributing the pressure so applied to the refractory material.

In carrying out the method of the invention I preferably apply to the back surface of the welding seam a relatively narrow and shallow box or trough 13, say about one inch deep, somewhat wider, and preferably longer, than the groove. The trough is filled with a granular refractory mineral material 14 and firmly held or clamped against the back surface of members 10 and 11 to be welded, in such a manner as to present to the back surface of the seam a surface of the said refractory material, thereby effectively cutting off access of air to the weld and preventing molten metal from running out of the seam. The welding operation is then carried out in the customary manner.

I have found that when the welding operation is carried out in this manner, there is formed along the back of the weld 15 a convex surface or bead similar to that customarily formed on the front surface of a weld, and this result constitutes one of the important advantages of the invention, for it not only ensures thorough bonding along the back of the weld, but produces a double bead without the necessity for making a separate bead weld along the back surface of the weld.

Figure 5:
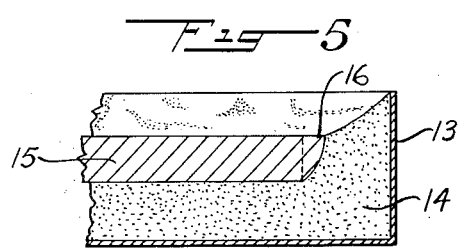
Fig. 5 represents a longitudinal cross-section taken at the end of a weld, showing the manner of building up the refractory material at the end of the seam and the formation of an extension of the bead around the end of the seam.
Figure 6:
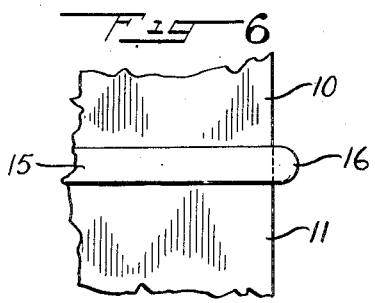
Fig. 6 represents a plan view of a finished weld showing the bead around the end of the weld.

It will also be evident that by extending the trough 13 beyond the ends of the welding groove or seam and suitably banking up the refractory material 13, the welding may be continued to the extreme ends of the groove or seam and a bead 16 may also be produced around the ends of the weld, as shown in Figures 5 and 6. The bead 16 may subsequently be cut off flush with the edges of the members.

I have found that when using the method of the invention in connection with electric welding it is possible and even desirable to employ an exceptionally high current density and to weld at an unusually high speed, which greatly increases the economy of welding operations.

Figure 2:
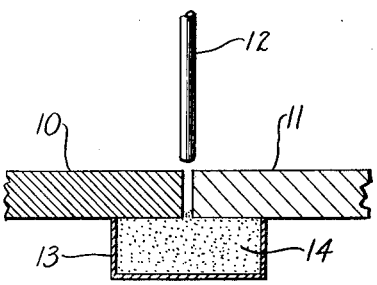
Figure 7:
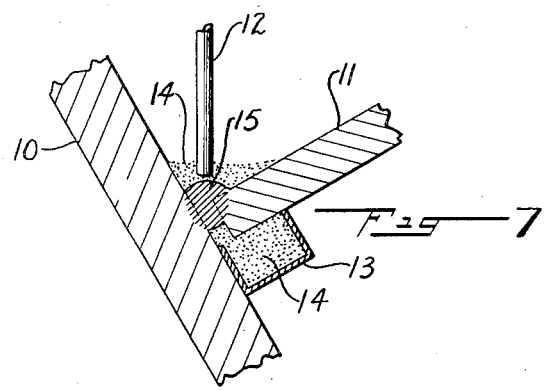
Fig. 7 represents a cross section of portions of two metal plates arranged in contiguous relation to be joined by a fillet type weld, the tip of the electrode being submerged under the mass of granular refractory mineral material.

An important advantage of the invention is the fact that in many cases it eliminates the necessity of beveling the edges of the members to be welded. I have found that it is not only possible but in some cases actually preferable to make the weld with square-cut edges as shown in Figures 2, 3 and 7, for the provision of my backing-up material in the manner shown makes it possible to assemble the objects to be welded, with a substantial gap between them, thereby ensuring at the same time the formation of a bead along the back surface of the weld, and a weld of substantially uniform width and strength from back to front. It will be evident that objects having beveled edges may in like manner be assembled for welding, with a gap between the contiguous back edges of the seam, in order to ensure the formation of a bead along the back surface of the weld.

In practice I have found that the fusion of the backing-up material provides room for the formation of a bead, and this fusion of the refractory material, in combination with the prevention of free access of air which is a feature of the invention, results in a weld, the back surface of which is not only beaded, but clean and free from irregularities, while the weld metal itself is substantially free of gas bubbles and slag inclusions which are common when metal backing-up strips are used.

A special application of the invention is in fillet welding, as for example in the construction of heavy machine bases where metal plates from one to four inches in thickness must be joined at difficult angles. Welds of this type, if made with metal backing-up strips, tend to develop strains which may crack the weld after it is completed. By applying the method of the invention, as shown for example in Fig. 7, such strains are minimized, since the weld metal and the metal members being joined by welding are heated and cooled more uniformly.

The refractory material used in the invention may have a wide variety of compositions. As indicated above, the material should be of such a nature that it can be fused by welding heat. Suitably it has a melting point not substantially higher than that of the metal to be welded, and is substantially free from gas-forming or other ingredients harmful to the weld. Preferably, the material consists chiefly of silicates of the alkaline earth metals and magnesium, substantially free from uncombined iron oxides. Fluidifiers or other fluxes may be added if desired. It is also preferred that the ingredients of the material should be mixed, prefused to complete chemical reactions between the ingredients, and subsequently crushed or ground to the desired size. A prefused material excellently suited to the purpose has the approximate composition, by analysis:

| | Per cent |
|---|---|
| CaO | 31 |
| MgO | 11 |
| $SiO_2$ | 52 |
| $Al_2O_3$ | 4 | to which a small proportion of an alkaline-earth fluoride, say 5%, may be added.

In electric welding operations where the tip of the electrode is submerged under a blanket of refractory material, as in Fig. 3, it is desirable to use the same refractory material for backing-up the weld as for submerging the end of the electrode. Materials of the type above described are suited to both purposes.

In order that the refractory material shall form an effective seal along the back of the welding seam, it is necessary that it be actually pressed against the back surface of the members to be welded. This may sometimes be accomplished merely by rigidly supporting the trough and permitting the weight of the metal members to press against the refractory material, or in other cases the trough may be clamped firmly against the metal members. Another method found to give satisfaction is to place a deflated pneumatic tube along the bottom of the trough in such a manner that when the tube is subsequently inflated it will press the granular refractory material against the back surface of the metal members.

The invention contemplates, as an alternative to the use of a stationary trough for supporting the refractory backing-up material, the use of relatively short trough-shaped forms which may be moved along the back of the welding seam or groove as the welding operation progresses.

While the method of the invention is particularly adapted to electric welding, such as electric arc welding employing either a bare or a coated metal electrode or a carbon electrode, it may be applied to other welding operations, such as gas and "Thermit" welding. Such uses of the method of the invention are to be understood as within the scope of the invention.

The invention provides a method of welding characterized by exceptional mechanical convenience; by elimination, in many cases, of the necessity of beveling the edges of the objects to be welded; by a minimizing of the difficulties due to irregularities of the surface of the metal members to be welded; by the production of a double bead weld without making a special bead weld along the back surface of the weld; and by the fact that exceptionally high welding speeds may be used.

I claim:

1. Process of welding which comprises assembling portions of metal members in contiguous relation to provide a seam to be welded; bridging and enclosing one side of said seam with a non-adhering mass of unbonded granular refractory mineral material free from substances that evolve gas when heated to welding temperature; and fusion-depositing weld metal in and along said seam from the other side of the latter, enough welding heat being used to melt at least a portion of the mineral material and to provide a joint beaded along its back surface.

2. Process of electric welding which comprises assembling portions of metal members in contiguous relation to provide a seam to be welded; enclosing each side of said seam with a mass of unbonded granular refractory mineral material having a melting point not substantially higher than that of the metal to be welded and free from substances which evolve gas when heated to welding temperature; disposing the end of a metal electrode in conductive relation with the mass along one side of said seam; and passing electric welding current through said electrode, a portion of said mass, and said members to fusion-deposit metal from said electrode in and along said seam.

3. Process of welding which comprises assembling portions of metal members in contiguous relation to provide a seam to be welded; enclosing the front and back surfaces of said seam with unbonded granular refractory mineral material substantially free from substances which evolve gas when heated to welding temperatures; and fusion-depositing weld metal in and along said seam from the front surface of the seam applying sufficient heat to coalesce the weld metal into the said metal members to produce the weld and to fuse a portion of the said refractory material adjacent to the back surface of the seam; whereby a welded joint beaded along its back surface is produced.

4. In a process for joining metal members by electric welding along a seam between said members, the steps which comprise backing-up the welding seam by applying against the back surface of the members a quantity of unbonded granular refractory mineral material having a melting point not substantially higher than that of the metal to be welded and free from substances which evolve gas when heated to welding temperature so disposed and supported as to seal the back of the welding seam against free access of air and to prevent molten weld metal from running out of the seam; overfilling the front of the seam with unbonded granular refractory mineral material substantially free from substances capable of evolving gas during welding; submerging an end of an electrode in the said material at the front of the seam; and passing a welding current of electricity through said electrode while maintaining the said end of the electrode submerged in said last-mentioned material.

5. In a process for joining metal members by electric welding along a seam between said members, wherein the tip of the electrode is submerged under a blanket of granular refractory mineral material, the steps which comprise backing up the welding seam by applying against the back surface of the members a quantity of unbonded granular refractory mineral material consisting chiefly of a silicate or silicates of at least one metal chosen from the group consisting of magnesium, calcium, barium, and strontium, and substantially free from substances capable of evolving gas during welding said material so disposed and supported as to seal the back surface of the welding seam against free access of air and to prevent molten weld metal from running freely out of the seam; and overfilling the front of the seam with a quantity of the same mineral material.

JAMES M. KEIR.